United States Patent [19]

Hiraoka

[11] Patent Number: 4,870,600
[45] Date of Patent: Sep. 26, 1989

[54] THREE-DIMENSIONAL IMAGE DISPLAY SYSTEM USING BINOCULAR PARALLAX

[75] Inventor: Katsumi Hiraoka, Kawasaki, Japan

[73] Assignee: Kabushiki Kaisha Toshiba, Kawasaki, Japan

[21] Appl. No.: 60,524

[22] Filed: Jun. 11, 1987

[30] Foreign Application Priority Data

Jun. 11, 1986 [JP] Japan ................................ 61-135170

[51] Int. Cl.⁴ ............................................. H04N 13/02
[52] U.S. Cl. ....................................... 364/522; 358/88
[58] Field of Search ......................... 364/522; 340/729;
358/88, 89; 434/43, 44

[56] References Cited

U.S. PATENT DOCUMENTS

| | | | |
|---|---|---|---|
| 4,214,267 | 7/1980 | Roese et al. | 358/89 X |
| 4,315,240 | 2/1982 | Spooner | 358/89 X |
| 4,347,508 | 8/1982 | Spooner | 434/44 X |
| 4,349,815 | 9/1982 | Spooner | 358/89 X |
| 4,634,384 | 1/1987 | Neves et al. | 434/44 |
| 4,649,425 | 3/1987 | Pund | 358/88 |
| 4,695,129 | 9/1987 | Faessen et al. | 358/88 X |

Primary Examiner—Gary V. Harkcom
Assistant Examiner—Mark K. Zimmerman
Attorney, Agent, or Firm—Oblon, Spivak, McClelland, Maier & Neustadt

[57] ABSTRACT

A three-dimensional image display system has an image generator, an image moving section, a movement controller, and an image supply section. The image generator generates first and second image data to be observed with the left and right eyes of an observer, respectively. The image moving section controls the image generator to cause the images of the first and second image data to be subjected to at least one of parallel movement and rotation. The movement controller controls the image moving section to cause it to provide at least one of parallel movement and rotation corresponding to the position of the observer to the images of the first and second image data. The image supply section separately supplies the first and second image data generated by the image generator under the control of the image moving section to the left and right eyes of the observer as visible images.

11 Claims, 4 Drawing Sheets

THREE-DIMENSIONAL IMAGE DISPLAY SYSTEM USING BINOCULAR PARALLAX

BACKGROUND OF THE INVENTION

The present invention relates to a three-dimensional image display system for performing a display by means of binocular stereoscopic imaging with which a stereoscopic effect is obtained by utilizing a binocular parallax.

Binocular stereoscopic imaging for obtaining a stereoscopic effect by utilizing a binocular parallax allows three-dimensional recognition of image data in the following manner. A two-dimensional image of a three-dimensional object as would be seen by an observer's right eye and another two-dimensional image as would be seen by the observer's left eye are obtained, and this pair of images are selectively supplied to the right and left eyes of the observer. Various techniques for displaying a pair of right and left images and selectively supplying them to the right and left eyes of the observer are used. For example, the following techniques are known:

(a) A pair of right and left images are displayed on a pair of two-dimensional displays or are divisionally displayed on right and left screens of a single two-dimensional display. These display images are supplied independently to the right and left eyes of the observer through a stereoscopic viewer consisting of a pair of optical systems.

(b) A pair of right and left images are displayed in different display colors on a single two-dimensional display so as to be superposed on each other. The images are observed through filter spectacles comprising filters which are colored so that only the images corresponding to the appropriately designated eyes can be seen.

(c) Polarization filters having polarization axes which are perpendicular to the front surfaces of a pair of two-dimensional displays for respectively displaying a pair of right and left images are arranged. Images passing through these polarization filters are synthesized using a half-mirror. The observer observes the synthesized image through polarization spectacles comprising appropriate polarization filters corresponding to the above polarization filters.

(d) A pair of right and left images are alternately displayed for one field or one frame on a single two-dimensional display (in a time-divisional manner). The observer observes the display images on the two-dimensional display through liquid-crystal shutter spectacles comprising liquid-crystal shutters which are alternately opened/closed in synchronism with the display timings of the right and left images.

(e) A pair of right and left images are projected by a pair of right and left projectors from one surface side of a double lenticular screen in which the rear surfaces of two lenticular sheets are bonded to each other to sandwich a diffusion transmission layer therebetween. A display image is observed from the other surface side.

The pair of images are images obtained by a pair of cameras arranged so as to be separated by a predetermined distance, or are images obtained before and after a single camera is moved appropriately.

When stereoscopy is performed in this manner, the position of the observer with respect to the display screen, i.e., a distance between the display screen and the observer and an angle from which the observer watches the display screen, are specified in advance when a pair of two-dimensional images are formed. When the observer watches the display screen from a position (distance and viewing angle) other than the specified position, i.e., those positions which are not appropriate for properly observing the display image, the observer experiences an unnatural stereoscopic effect or suffers from noticeable fatigue of the eyes.

In this manner, in the conventional three-dimensional image display system using binocular stereoscopic imaging, the appropriate viewing position for obtaining a stereoscopic effect is specified. Therefore, the effective observation position is considerably limited.

SUMMARY OF THE INVENTION

It is an object of the present invention to provide a three-dimensional image display system which can obtain an optimal stereoscopic effect for an observer regardless of the distance and viewing angle of the observer with respect to a display screen, and can facilitate recognition of a three-dimensional pattern.

The three-dimensional image display system according to the present invention has an image generator, an image movement processor, a moving distance controller, and an image supply section. The image generator generates first and second image data which are observed by the left and right eyes, respectively. The image movement processor directly or indirectly controls the image generator to cause images of the first and second image data to be subjected to at least one of parallel movement and rotation. The moving distance controller controls the image movement processor to provide at least one of appropriate parallel movement and rotation to the images of the first and second image data. The image supply section separately supplies the first and second image data which are generated by the image generator to the left and right eyes of the observer as visible images under the control of the image movement processor.

Stereoscopy by means of binocular stereoscopic imaging utilizes the fact that the binocular parallax depends on a distance from the three-dimensional object to each eye of the observer. When the distance from the three-dimensional object to the observer or the viewing angle is changed, the parallax is also changed. Therefore, when the distance from the display screen for three-dimensional display to the observer or the viewing angle is changed, an appropriate stereoscopic effect cannot be obtained unless the parallax provided to a three-dimensional display is appropriately changed.

According to the three-dimensional image display system of the present invention, a parallel movement distance and a rotation angle of a three-dimensional display image, i.e., a pair of right and left images, are appropriately controlled, and an optimal parallax corresponding to the distance and viewing angle of the observer can be obtained. For this reason, even if the observer is located at any position with respect to the display screen, a very natural stereoscopic effect can be obtained, and eye fatigue during observation can be greatly reduced.

Detailed Description of the Preferred Embodiments

Figure 1:
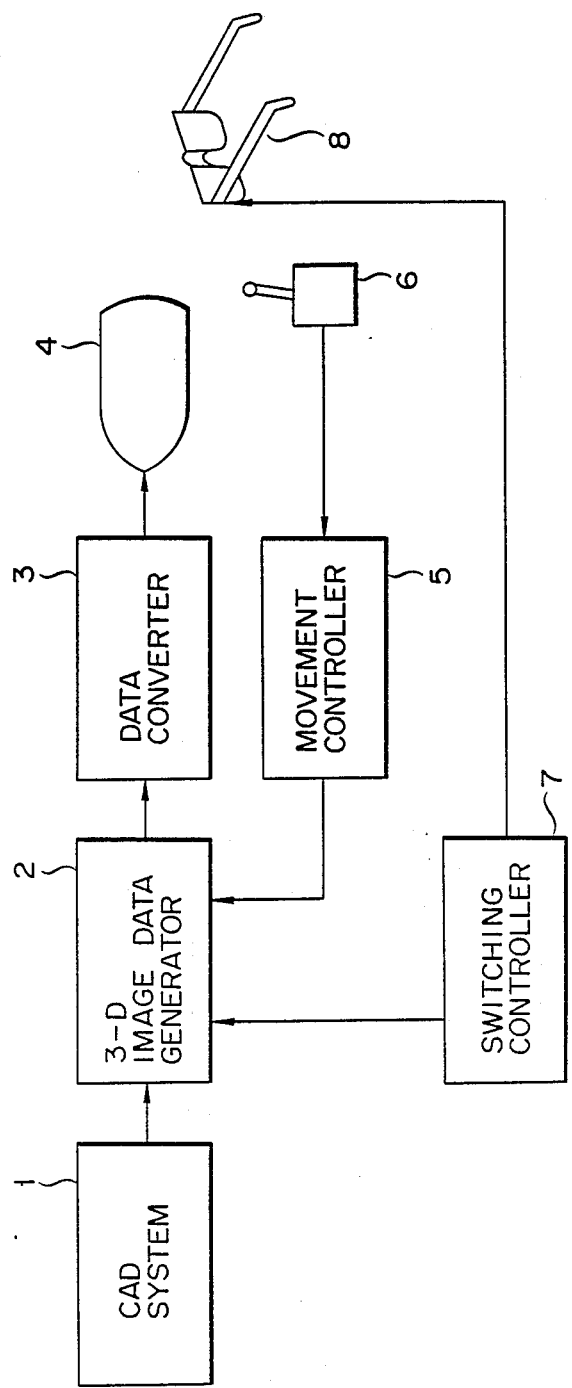
FIG. 1 is a block diagram showing an arrangement of a three-dimensional image display system according to a first embodiment of the present invention.

FIG. 1 shows a three-dimensional image display system according to a first embodiment of the present invention.

The system shown in FIG. 1 is an embodiment of the present invention which is applied to a display system of a CAD system which can obtain three-dimensional pattern data.

The system shown in FIG. 1 comprises CAD system 1, three-dimensional image data generator 2, data converter 3, display 4, movement controller 5, joystick 6, switching controller 7, and shutter spectacles 8.

CAD system 1 is a system for generating data of a design drawing and the like, based on coordinate data inputs by various coordinate data input apparatuses (e.g., a pointing device, such as a mouse, a tracking ball, and the like, or a graphic input apparatus such as a digitizer and an image reader), numerical data inputs by a keyboard, and various other functions inputs. In this case, system 1 can obtain three-dimensional pattern data of a subject. The three-dimensional pattern data generated by CAD system 1 is stored in its internal memory. The three-dimensional pattern data stored in the memory of system 1 consists of a set of three-dimensional coordinate data, a set of three-dimensional distance/viewing angle vectors, or a combination thereof, and data indicating the interior or the exterior of the subject. Based on the three-dimensional pattern data stored in the memory of CAD system 1, three-dimensional image data generator 2 generates by arithmetic operations two pieces of two-dimensional image data which will be respectively viewed by the observer's right and left eyes when the subject of interest is observed from a predetermined angle at a predetermined distance therefrom. A pair of two-dimensional image data generated by generator 2 are "raw" data necessary for displaying two-dimensional images, such as a set of coordinate data of a very high density or a set of two-dimensional distance/viewing angle vectors. A pair of right and left two-dimensional image data generated by generator 2 are alternately output in response to a switching control signal supplied from switching controller 7. The two-dimensional image data output from generator 2 are supplied to data converter 3. Converter 3 converts the two-dimensional image data into display data corresponding to the display capacity and characteristics of display 4, i.e., image data directly corresponding to the display coordinates of display 4. Display 4 comprises a CRT (cathode-ray tube) display, a liquid-crystal display, or a plasma display. Switching controller 7 supplies the switching control signal to generator 2, and determines switching timings of the right and left two-dimensional image data output from generator 2. Typically, the switching operation of the right and left two-dimensional image data outputs is performed for one field or one frame of a display image. The switching control signal output from controller 7 is also supplied to shutter spectacles 8. Spectacles 8 comprise a pair of liquid-crystal shutter filters which are electrically opened/closed in correspondence with the right and left eyes. The liquid-crystal shutter filters are electrically controlled to have high transparency (shutter open) or have very low transparency (shutter closed). Shutter spectacles 8 alternately open or close the pair of right and left liquid-crystal shutter filters in response to the switching control signal output from controller 7. The alternate opening/closing operation of the liquid-crystal shutter filters is synchronized with the switching operation of the right and left two-dimensional image data output from generator 2. More specifically, shutter spectacles 8 are driven as follows. While the two-dimensional image data for the right eye is displayed, the shutter at the side of the right eye is opened. While the two-dimensional image data for the left eye is displayed, the shutter at the side of the left eye is opened. In this manner, the right and left two-dimensional images alternately displayed on the screen of display 4 are separately supplied to the right and left eyes of the observer wearing shutter spectacles 8. The observer can thus observe a stereoscopic image.

When the distance and viewing angle of the observer with respect to the display screen of display 4 are inappropriate, i.e., when an appropriate stereoscopic effect cannot be obtained, the observer operates joystick 6. By operation of the observer, joystick 6 generates a movement control signal representing an appropriate viewing position.

Movement controller 5 controls the operation of generator 2 in response to the movement control signal. More specifically, under the control of movement controller 5, generator 2 changes the imaginary positions the right and left eyes when the pair of right and left two-dimensional image data are generated. Upon change in imaginary positions of the right and left eyes, the two-dimensional image data are individually subjected to parallel movement and rotation. In this case, the parallel movement and rotation of the pair of two-dimensional image data correspond to parallel movement in the right-and-left direction or rotation about a vertical line. The movement and rotation are in opposite directions for the right and left images. When the observer operates joystick 6 while observing the display screen of display 4, he can adjust the system so as to obtain a natural and appropriate stereoscopic effect, even if he observes the display screen from any distance or angle.

In this system, when the observer watches the display screen of display 4 with shutter spectacles 8, he can sense a stereoscopic image corresponding to the binocular parallax. Only a two-dimensional display is made in a conventional CAD system, while stereoscopy can be performed in the CAD system according to the system of the present invention. Therefore, the shape of designed parts can be accurately recognized, thus providing advantageous references for design. In this system, the observer, i.e., a designer, can obtain an optimal parallax in accordance with his position and direction with respect to the display screen by means of movement controller 5 and joystick 6. For this reason, a natural stereoscopic image can be obtained, and an observer can be free from eye fatigue.

In the system shown in FIG. 1, if movement controller 5 further has a function for causing right and left two-dimensional images to be subjected to parallel movement and rotation so as to change a three-dimensional position and direction of a display image, a three-dimensional object as a whole can be desirably rotated/- moved, and a designed article can be stereoscopically observed from various angles.

Figure 2:
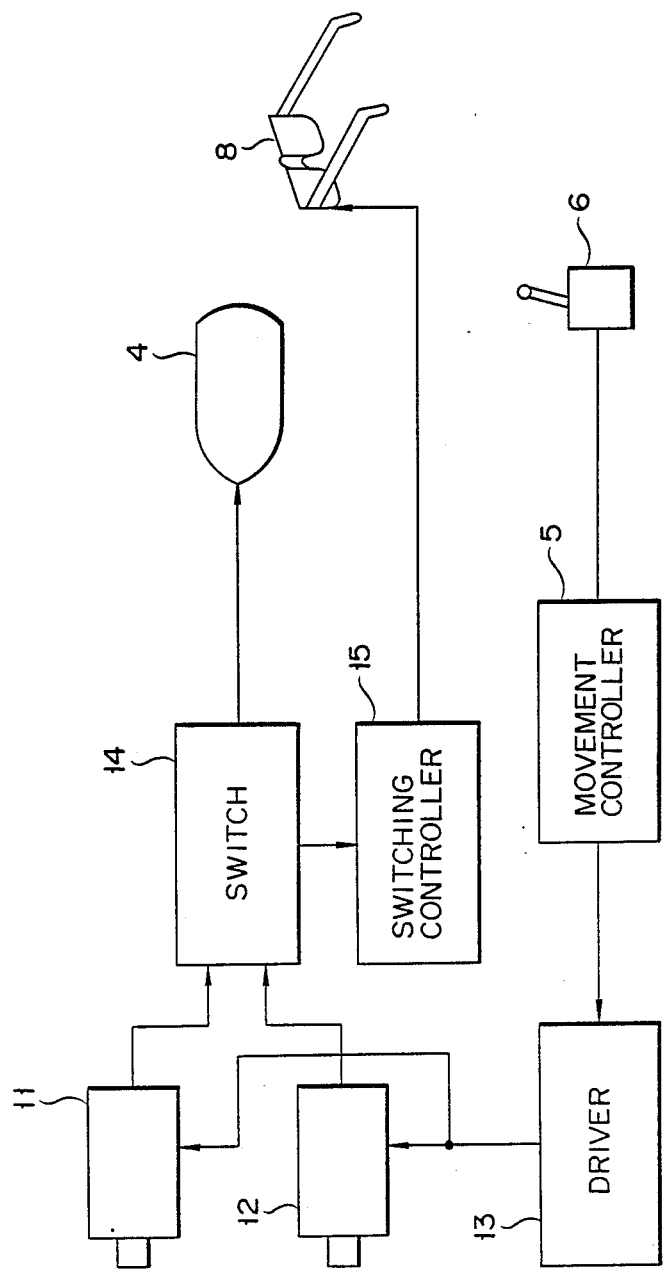
FIG. 2 is a block diagram showing an arrangement of a three-dimensional image display system according to a second embodiment of the present invention.

FIG. 2 shows a three-dimensional image display system according to a second embodiment of the present invention.

The system shown in FIG. 2 is an embodiment of the present invention which is applied to a remote monitor system using a TV (television).

The system shown in FIG. 2 comprises TV cameras 11 and 12, driver 13, switch 14, and switching controller 15 in addition to display 4, movement controller 5, joystick 6, and shutter spectacles 8, as shown in FIG. 1.

TV cameras 11 and 12 produce TV images of an object corresponding to images an observer would see with his right and left eyes. TV cameras 11 and 12 can be parallel-moved/rotated by driver 13. In this case, the parallel movement and/or rotation can be performed by zooming/shifting (tilting) control of imaging lens systems instead of moving cameras as a whole. A pair of right and left video signals obtained by TV cameras 11 and 12 are supplied to switch 14. Switch 14 alternately switches and outputs the right and left Video signals for each field. Switch 14 supplies a switching signal to switching controller 15 in synchronism with the alternate switching operation of the right and left video signals. Switching controller 15 controls shutter spectacles 8 in response to the switching signal.

Figure 3:
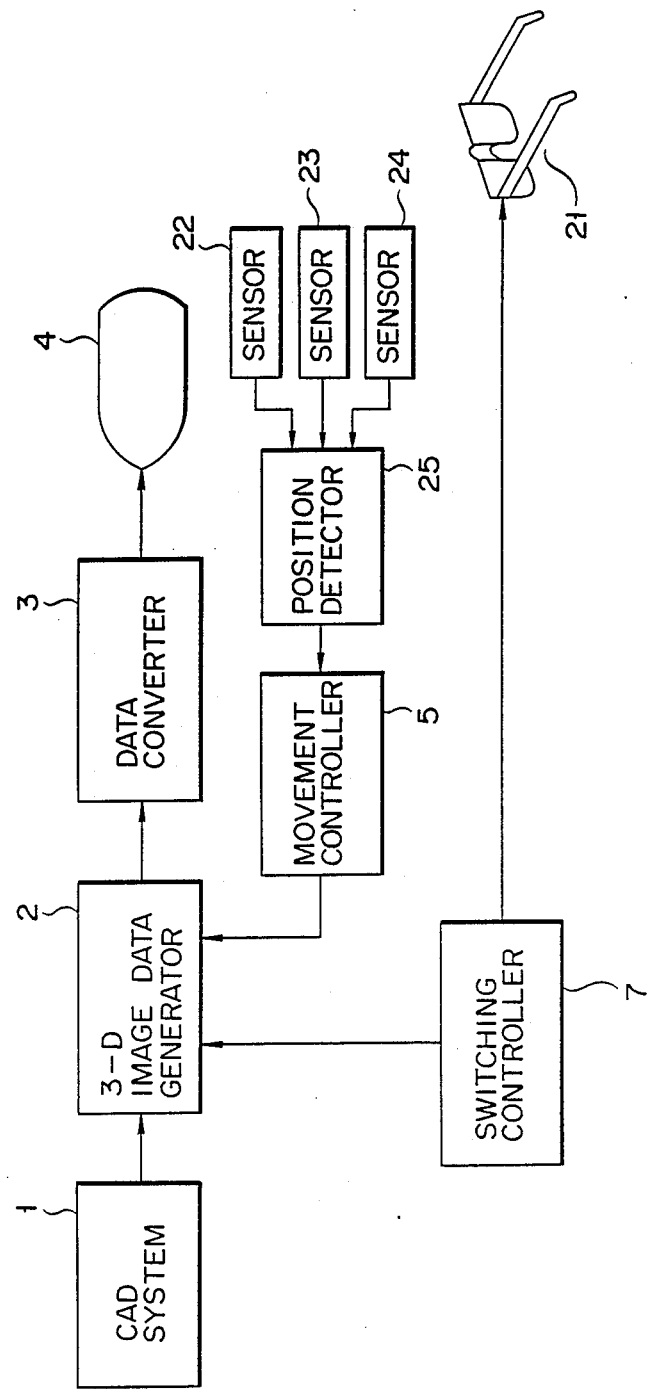
FIG. 3 is a block diagram showing an arrangement of a three-dimensional image display system according to a third embodiment of the present invention.

FIG. 3 shows a three-dimensional image display system according to a third embodiment of the present invention.

In the system shown in FIG. 3, a function for automatically detecting and feeding back the distance and viewing angle of an observer is added to a system substantially the same as that shown in FIG. 1.

The system shown in FIG. 3 comprises shutter spectacles 21, sensors 22, 23, and 24, and position detector 25 in addition to CAD system 1, three-dimensional image data generator 2, data converter 3, display 4, movement controller 5, and switching controller 7 similar to those shown in FIG. 1.

Figure 4:
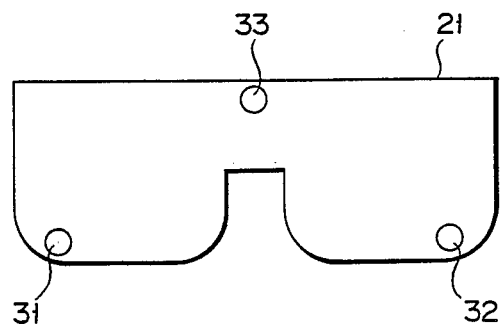
FIG. 4 is a view illustrating an arrangement of spectacles used in the system shown in FIG. 3.

As shown in the front view of FIG. 4 in detail, shutter spectacles 21 have ultrasonic oscillators 31, 32, and 33 at the right and left (with reference to the observer) lower end portions and the upper central portion. Ultrasonic oscillators 31, 32, and 33 generate ultrasonic waves having different wavelengths. Sensors 22, 23, and 24 are fixed to the appropriate positions around the display screen so as not to change relative positions with respect to the display screen, and receive the ultrasonic waves from oscillators 31, 32, and 33 of spectacles 21. Position detector 25 discriminates distance from the sensors to oscillators 31, 32, and 33 based on the detection signals from sensors 22, 23, and 24. Based on the discrimination results, detector 25 calculates the position of shutter spectacles 21, i.e., the distance and viewing angle of the observer, with respect to the display screen. The calculation result is supplied to movement controller 5. In accordance with the calculation result, movement controller 5 controls three-dimensional image data generator 2 so as to cause it to generate a pair of two-dimensional image data corresponding to the distance and viewing angle of the observer with respect to the display screen.

What is claimed is:

1. A three-dimensional image display system comprising:

image data generating means for generating a pair of first and second image data, having binocular parallax to be observed with the left and right eyes of an observer, respectively;

movement control means for controlling said image data generating means to cause images of the first and second image data to provide at least one of appropriate parallel movement and rotation, whereby the binocular parallax is controlled in accordance with a distance and viewing angle of the observer to the image of the first and second image data; and image supply means for separately supplying the first and second image data generated by said image data generating means to the left and right eyes of the observer as visible images.

2. A system according to claim 1, wherein said movement control means includes operation control means for controlling said binocular parallax in response to a manual operation by the observer.

3. A system according to claim 1, wherein said movement control means includes position detection means for detecting an observation distance and viewing angle of the observer, and control means for controlling said movement control means in response to said position detection means.

4. A system according to claim 1, wherein said image data generating means includes processing means for generating the first and second image data from three-dimensional coordinate data representing a display object by arithmetic operation processing.

5. A system according to claim 4, wherein said movement control means includes means for causing the images of the first and second image data to be subjected to at least one of parallel movement and rotation in the arithmetic operation processing for generating the first and second image data from the three-dimensional coordinate data.

6. A system according to claim 1, wherein said image data generating means includes a pair of imaging means for imaging a display object from different positions, and drive means for controlling the distance and viewing angles of said imaging means.

7. A system according to claim 6, wherein said movement control means includes means for controlling said drive means so as to cause the images of the first and second image data to be subjected to at least one of parallel movement and rotation.

8. A three-dimensional image display system in which first and second image data corresponding to the left and right eyes of an observer are generated, and the first and second image data are selectively supplied to the left and right eyes of the observer, so that the observer can view an image with a stereoscopic effect based on a binocular parallax, comprising:

first means for generating a pair of the first and second image data having appropriate binocular parallax in accordance with a distance and a viewing angle of the observer; and second means for feeding back the distance and the viewing angle of the observer to said first means.

9. A system according to claim 8, wherein said second means includes means for recognizing the distance and the viewing angle of the observer.

10. A three-dimensional image display system comprising:

image data generating means for generating a pair of first and second image data, having binocular parallax, to be observed with the left and right eyes of an observer, respectively;

movement control means for controlling said image data generating means in response to a manual operation by the observer to cause the first and second image data to provide at least one of parallel movement and rotation whereby the binocular parallax is controlled for changing the distance and viewing angle of a three-dimensional display image to the images of the the first and second image data; and image supply means for separately supplying the first and second image data generated by said image data generating means to the left and right eyes of the observer as visible images.

11. A three-dimensional image display system comprising:

image data generating means for generating a pair of first and second image data, having binocular parallax, to be observed with the left and right eyes of an observer, respectively;

movement control means for controlling said image data generating means to cause the image of the first and second image data to provide at least one of appropriate parallel movement and rotation, whereby the binocular parallax is controlled in accordance with a distance and viewing angle of the observer;

display means for displaying the first and second image data generated by said image data generating means under the control of said movement control means; and image selecting means for selecting and supplying the first and second image data displayed by said display means to the left and right eyes of the observer, respectively.

* * * * *